United States Patent [19]

Therien et al.

[11] 4,331,275
[45] May 25, 1982

[54] ORTHOGONAL FILM DRIVE

[75] Inventors: Robert D. Therien, Newbury Park; Edward J. Kraemer, Canoga Park; Michael W. Rudy, Thousand Oaks, all of Calif.

[73] Assignee: Terminal Data Corporation, Woodland Hills, Calif.

[21] Appl. No.: 196,245

[22] Filed: Oct. 14, 1980

[51] Int. Cl.³ .................... B65H 17/22; B65H 25/26
[52] U.S. Cl. .................................. 226/188; 226/19; 226/122; 355/95
[58] Field of Search .......................... 352/82, 83, 159; 355/53, 54, 95, 96; 226/188, 19, 20, 122–124; 354/85, 86

[56] References Cited

U.S. PATENT DOCUMENTS

| | | | |
|---|---|---|---|
| 3,601,487 | 8/1971 | Burton et al. | 355/53 |
| 3,767,302 | 10/1973 | Roberts et al. | 355/53 |
| 4,175,854 | 11/1979 | Ammann et al. | 355/54 |
| 4,235,543 | 11/1980 | Norris | 354/86 |

*Primary Examiner*—Leonard D. Christian
*Attorney, Agent, or Firm*—Harry R. Lubcke

[57] ABSTRACT

A high precision strip film drive, typically for microfiche film, that includes two spaced-apart drive rollers, separately driven by two servo electric motors. The motors are biased against each other and so maintain a constant tension on the film, while it is stationary or moving.

The motors are logic controlled through a pair of rotary encoders. Each encoder is driven by one roller. The outputs of the encoders are combined to give a single servo control signal, devoid of film squew, for accurately spacing the frames upon the microfiche.

The encoder electrical outputs are differently handled to provide film velocity information, and still further differently handled to provide direction of motion of the film information.

Transverse orthogonal motion of the film is provided by a carriage that supports the rollers, a linear encoder, and a cable system actuated by a third servo motor.

The encoder electrical outputs are even further differently handled to accurately finally position the film, as preselected.

13 Claims, 7 Drawing Figures

ORTHOGONAL FILM DRIVE

BACKGROUND OF THE INVENTION

This invention pertains to an electronically-controlled precision drive for moving a film web; in both longitudinal and transverse directions.

Such a drive is frequently used for successively positioning unexposed photographic film for exposing the same in a microfiche camera having a stationary lens.

One such camera is that of Burton et al, U.S. Pat. No. 3,601,487, a camera that has been well-known in the art for several years. A different structure and mode of electronic control of the present invention achieves greater accuracy.

In this U.S. Pat. No. 3,601,487 the longitudinal drive for the film is accomplished by one stepper motor simultaneously driving two spaced rollers 21 and 22. The transverse (orthogonal) drive is accomplished by a cable system that acts upon a carriage and employs one rotary encoder at one point along the cable. A servomotor 8 drives the cable under the logic control of the rotary encoder.

Another camera is that of Roberts et al, U.S. Pat. No. 3,767,302.

Again, the longitudinal drive for the film is accomplished by one stepper motor; which, however, drives only roller 18. At the other (top) end of the exposure area there are merely guide rollers, free rolling.

The transverse drive is accomplished by a rack upon a carriage, with a pinion on a stationary motor engaging the rack. The carriage also carries linear format control means; i.e., an opaque strip having gross apertures related to the spacing between individual frames of the fiche and the number of such frames to be accomodated. (This gross type of encoder is the same type as the rotary encoder utilized by Burton, U.S. Pat. No. 3,601,487.)

SUMMARY OF THE INVENTION

A carriage carries two rollers, between which the film is held at constant tension by separate servo-motors that are electrically biased in opposite directions of rotation. This is accomplished by logic control through a pair of rotary encoders, each individually driven by one of the said rollers.

The bias is constant in value, keeping the tension constant. At rest, these biases are centered at zero electrical energy. With the film in motion, the center of the bias moves away from zero.

The encoder signals are electrically compared to give a single signal that indicates the precise position of the film, devoid of squew.

The encoder outputs are also differently electronically processed to provide film velocity of motion information, and are still further differently processed to provide direction of motion of the film information.

Transverse orthogonal motion of the film is provided by the carriage, which has a finely divided linear encoder. Precision transverse spacing is provided by logic that is a duplicate of that for the longitudinal film motion, this logic; however, being controlled by the output of the linear encoder.

DESCRIPTION OF THE PREFERRED EMBODIMENTS

Figure 1:
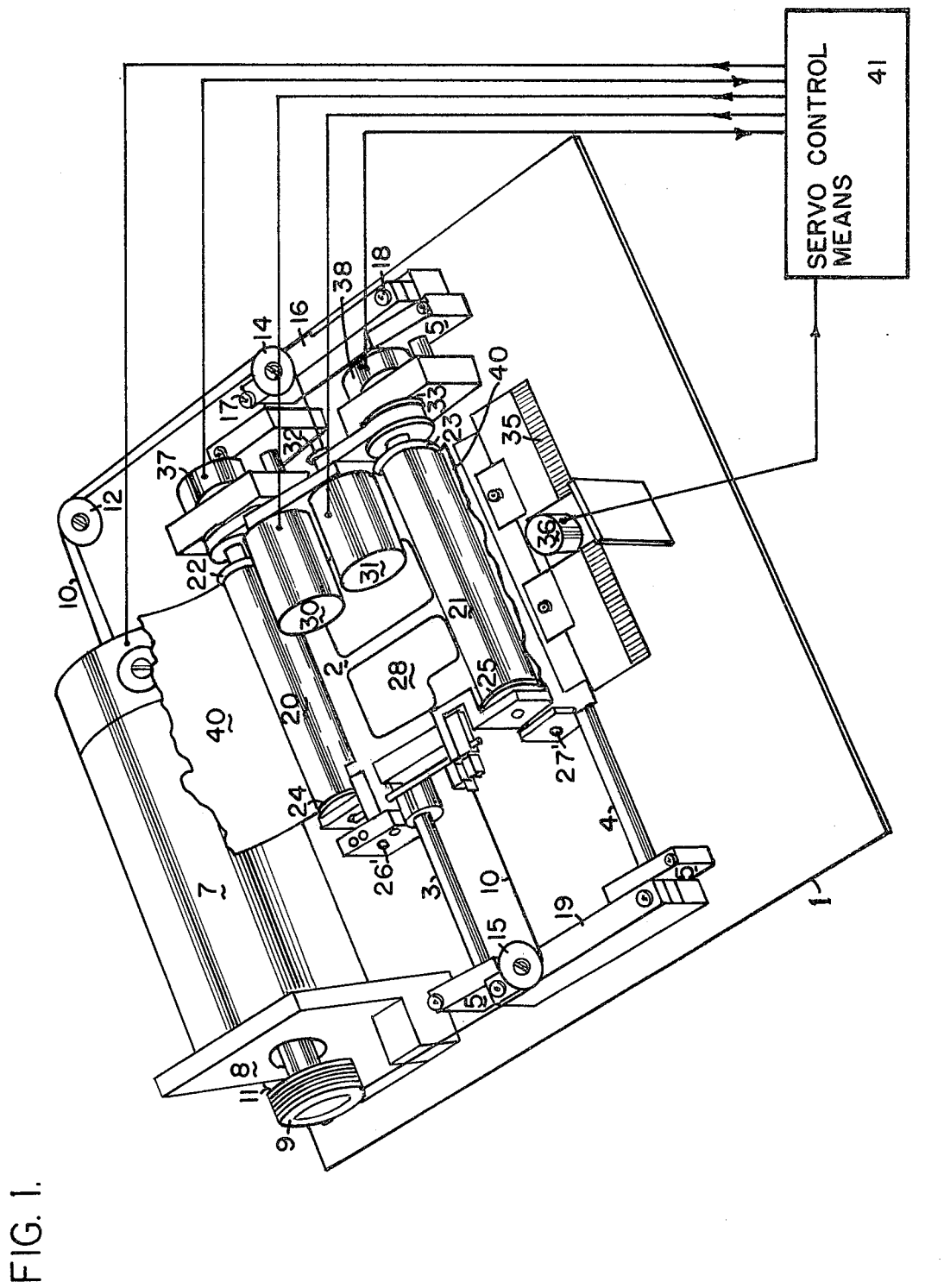
FIG. 1 is a perspective view of the orthogonal film drive mechanism.

In FIG. 1, numeral 1 indicates a stationary base for the mechanism that may be a part of a camera case (not shown).

Carriage 2 translates film 40 transversely of the length of the film upon ways, such as polished stainless steel rods 3 and 4. Typically, ball bushings are mounted at three points on the carriage. Two bushings are mounted at opposite extremities of the carriage and surround one rod. The other bushing is mounted centrally of the carriage and surrounds the other rod. The rods are securely mounted on the base by four supports 5.

A relatively large servo-motor 7 is mounted upon base 1 by bracket 8. Motor 7 operates on direct current and may be a permanent magnet type, having a speed of from zero to 250 revolutions per minute and a torque of 550 gram-centimeters in continuous operation.

A flexible multistrand cable 10 passes around several pulleys and transmits the motion originated by motor 7 to carriage 2. The cable is typically about one millimeter (mm) in diameter.

Pulley 9 is attached to the motor and has plural, say eleven turns of a single spiral groove around the periphery, of the nature of a thread on a bolt. Cable 10 is wrapped twice around the pulley to arrange the entrance to and the departure from the pulley at 180°; i.e., are in line.

The cable is strung with a tension of approximately six kilograms (kg). This considerable tension is neutralized by the 180° configuration insofar as the bearings of motor 7 are concerned, thus promoting long bearing life.

First pulley 11 in the cable run is disposed behind motor pulley 9 in FIG. 1. It alters the direction of the cable run from perpendicular to the rear edge of base 1 to parallel thereto. Second pulley 12 alters the direction of the cable run by 90° and causes it to run parallel to the right edge of the base. Third pulley 14 alters the direction of the cable run, centrally of the base, to alignment of the cable with the required motion of carriage 2, to which it is fastened at the right side thereof.

Similarly, the opposite end of cable 10 is centrally fastened to the left side of the carriage. The cable passes over pulley 5, to alter the direction of the cable run by 90° and make the return to motor pulley 9.

Pulley 14 is mounted upon arm 16, which has fulcrum screw 17 near the pulley and locking screw 18 at the far end of the arm within an elongated hole. By moving the arm incrementally and locking the position with screw 18 the tension upon cable 10 can be adjusted. A similar construction is used with respect to pulley 15 and arm 19. Thus, two means are provided for tension adjustment.

Two film-engaging rollers 20 and 21 are mounted upon carriage 2. These rollers are typically of aluminum and are rubber coated. They are ground to be cylindrical and to rotate concentrically with integral shafts at each end.

The overall size is not critical. The rolls may have a diameter of 2.5 cm and a length of 10.3 cm. Equality of the diameters and the concentricity of the two rollers are critical parameters.

At the right end of roller 20 in FIG. 1, an axially spring-loaded flange 22 is located. Flange 23 is similarly located with respect to roller 21. These flanges rotate with the respective rollers.

With 105 mm wide film (the usual microfiche width) these flanges urge the film against axially fixed rotating flanges 24 and 25. These flanges are mounted on the opposite ends of rollers 20 and 21 with respect to flanges 22 and 23.

Beneath roller 20 is resiliently coated roller 26 of equal size. Similarly, below roller 21 is coated roller 27. (Rollers 26 and 27 are not seen in FIG. 1, but are represented by corresponding shaft ends 26' and 27'.)

Film 40 passes between rollers 20 and 26 just below the frame of carriage 2 in order to be in the focal plane of an objective lens (not shown), for photographic use of this film drive. The film then passes between rollers 21 and 27 and onward to take-up facilities (not shown).

During photographic exposure the film is preferably held against the underside of a platen 28 (see FIG. 1) by vacuum.

Servo-motor 30 is disposed adjacent to roller 20 upon carriage 2 and may be coupled for rotating the roller by a toothed belt. By utilizing belt sprockets of appropriate diameters upon the motor and roller shafts a speed reduction of 3 to 1 is preferably obtained. A 40DP/60T belt may be used.

A similar drive is separately arranged between servo-motor 31 and roller 21. Smaller sprocket 32 is mounted on the motor shaft and larger sprocket 33 is mounted on the roller shaft.

Suitable ball-bearings journal each end of the shafts of rollers 20 and 21.

Linear encoder 35 is attached forward of carriage 2, as shown in FIG. 1, and is substantially coextensive therewith. The encoder has alternate transparent and opaque lines. These are disposed transversely with respect to the movement of the carriage. The lines occur eighty to the centimeter, for example, and are preferably delineated with uniformity to within 50 micro-centimeters.

Photoelectric reader 36 of the encoder is stationary and is located centrally upon base 1. It has a light source shining upon encoder 35 from one side and photoelectric means positioned oppositely to accept the light that passes through the transparent lines of the encoder.

Rotary encoder 37 is attached to the shaft of roller 20, at the right end in FIG. 1, for internal rotation of the encoder. The stationary external part seen is mounted upon carriage 2. A typical resolution for the encoder is 600 lines for 360°. This gives 0.125 mm peripheral motion of the roller per encoder cycle of one line to the next line.

A duplicate rotary encoder 38 is attached to the shaft of roller 21.

Figure 2:
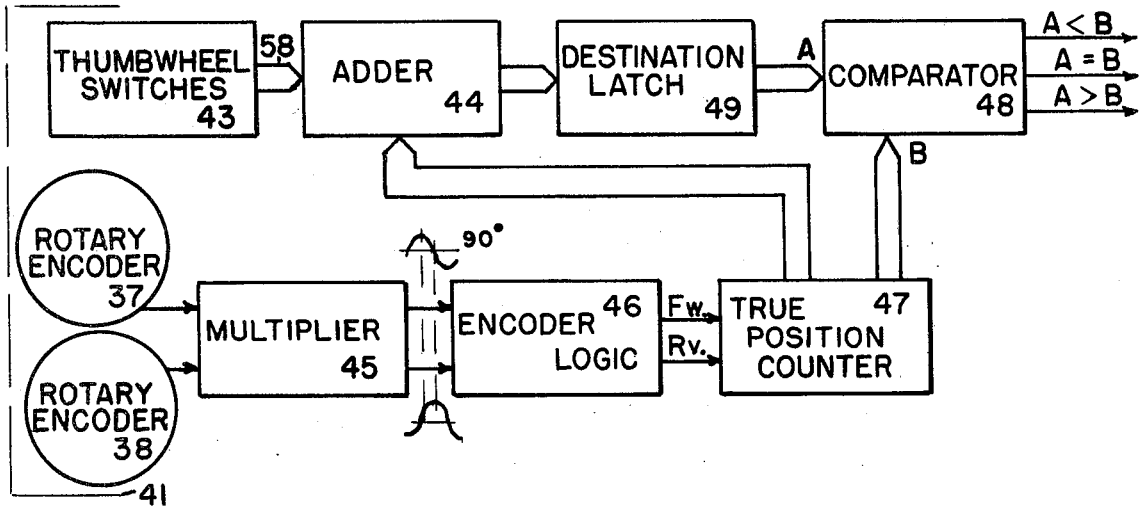
FIG. 2 is a block electrical diagram of the logic coactive with the servo-motors for translating the film longitudinally.

The two encoders 37 and 38 provide inputs to the logic of FIG. 2. From such inputs servo-motors 30 and 31 are controlled to space the individual frames within a microfiche and to also move film 40 from one whole microfiche to the next. This spacing is typically in the row mode.

Typically, carriage 2 is fitted with a vacuum platen, as 28, a vacuum connection thereto, and optical and film-handling elements to constitute a microfiche camera, or the equivalent. Conversely, the orthogonal drive of this invention may be a part of an other device where stop motion in two dimensions at right angles is required.

Microfiche camera teaching will be found in U.S. Pat. Nos. 3,601,487 and 3,767,302, of common ownership with this application; which patents are therefore included herein by reference.

The stationary metal parts of this invention are typically formed of black anodized aluminum to minimize spurious photographic exposures.

The width of the film may be other than the 105 mm previously considered. This can be accomplished without reconstruction of the apparatus of this invention.

For narrower film, duplicate edge guides 24 and 25 can be provided closer to flanges 22 and 23 by being mounted on an aperture plate that is disposed below film 40 in FIG. 1. It is usual that an aperture plate is arranged to be removable and to have a size of aperture that is pertinent to the size of the film. A 16 mm width of film is an alternate to the 105 mm width.

In forming microfiche it is necessary to provide logic that establishes the spacing between frames in the columns and rows, also the margins between the frames and the edge of the fiche film. In FIG. 1 this logic is indicated in general by servo control means 41.

With this invention the operator makes a choice as to inter-frame spacings and as to margins by entering appropriate numerical values in sets of thumbwheel switch means 43 in FIG. 2. These values become effective in the logic circuit by coactive coupling between the thumbwheel switches and adder 44. Thick arrow 58 signifies plural electrical connections, with signals flowing in the direction of the arrow.

Information as to the position of film 40 in the film drive apparatus is provided by rotary encoders 37 and 38, previously described. The electrical output therefrom enters a series of electronic multipliers 45, of the XR2208 type. Encoders 37 and 38 also provide source apparatus for generating a velocity of film translation signal, to be later considered.

For the present purpose a single position signal is obtained that is representative of the true position of the film, corrected for minor but significant slip that is caused by the necessary transverse stepping of film 40 to form the known microfiche.

This output enters encoder logic 46, which is comprised of AND and OR gates for decoding the sine and cosine functions, which are 90° out of phase. This provides forward and reverse counting pulses corresponding to the movement of film 40, as sensed by encoders 37 and 38.

In order to further describe these elements of the apparatus, assume that the operator has chosen a column pitch of 30 on the thumbwheel switches. In a typical embodiment each pitch unit represents a film movement of 0.25 mm; i.e., from the edge of one frame of the fiche to the corresponding edge of the adjacent frame is 7.5 mm. This count is resident in adder 44.

True position counter 47 accepts the count from encoder logic 46, conveys it to adder 44, and also to comparator 48, as count B.

Further assume that the film is at the beginning of a fiche and that the count in true position counter 47 is zero. Adder 44 sums the two counts impressed upon it; i.e., 30+0=30. This number is transferred to destination latch means 49. This may be a T$^2$L device of the 74–175 type. The output of the latch enters comparator 48, as count A.

One output of the comparator is identified as the line A>B. This is connected to the servo control for motors 30 and 31 to enable these motors to reel film 40 forward. Count B, from true position counter 47 increases with the forward motion of the film. When this count reaches 30 in the example chosen, the other output line A=B is energized, to provide a Stop command.

Should the film be reeled too far, an A<B output is obtained. This engenders a reverse command to the servo control, which corrects the overshoot and brings the output to Stop.

The next film advance command adds another 30 counts to adder 44, and thus to destination latch 49. True position counter still has a count of 30. Thus, the 30+30=60 count in latch 49 causes comparator 48 to give an output at A>B. This energizes the motors forward again until A=B, and a second cycle is completed.

These cycles are repeated until a full row or column is completed; say a format of 10 rows by 14 columns. At each full row or column, true position counter 47 and destination latch 49 are reset to zero, so that a new row or column can be started.

A margin-determining thumbwheel is included in switches 43. This interposes an additional count to provide the margin space on the film from one fiche to the next.

The above whole process is repeated automatically for fiche after fiche in this "off-line" mode of operation. An "on-line" mode is also possible, in which the external interface has data-line control of every aspect of the above cycles. Data lines substutionally replace thumbwheel switches 43.

The circuit of FIG. 2 always causes motors 30 and 31 to run "fast". That is, at a rapid speed, to traverse from one frame to the next in minimum time. However, at such a pace the servos tend to overshoot and the film must be brought backward; a waste of time.

Figure 3:
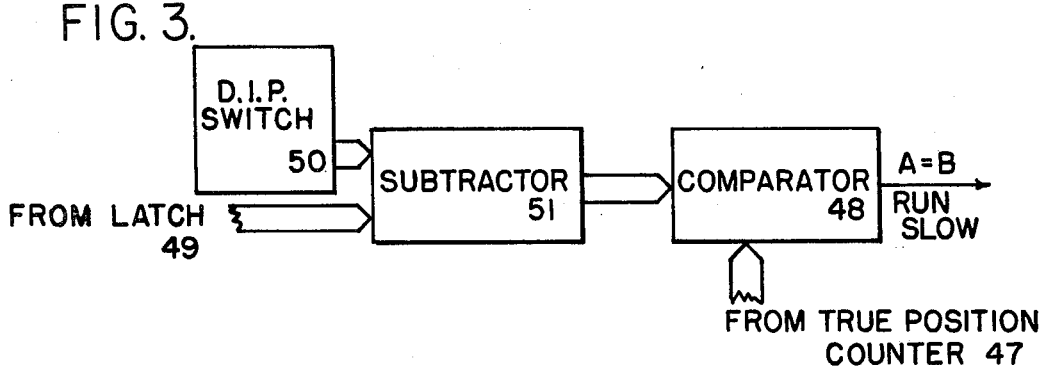
FIG. 3 is a block electrical diagram of "run slow" logic.

The circuit of FIG. 3 adds two elements to the circuit of FIG. 2, to interpose a run "slow" interlude prior to the Stop command. This minimizes overshoot.

A multiposition switch, as four position DIP switch 50 having a power of 2 capability, allows an output to be selected from any combination of 1, 2, 4 & 16.

This output enters an adder, arranged to be a subtractor, 51. Also into the subtractor enters the output of destination latch 49 of FIG. 2. The output of subtractor 51 enters comparator 48 of FIG. 2.

As an example of the operation, assume that the output from the destination latch is 60 and it is desired that the motors run "slow" for 7 counts before the full count of 60. Switch 50 is then set at 7, being=1+2+4. The output from the subtractor is 60−7=53. When the output enters comparator 48 from true position counter 47 the A=B criterion will be met and the run "fast" mode will be terminated.

Figure 4:
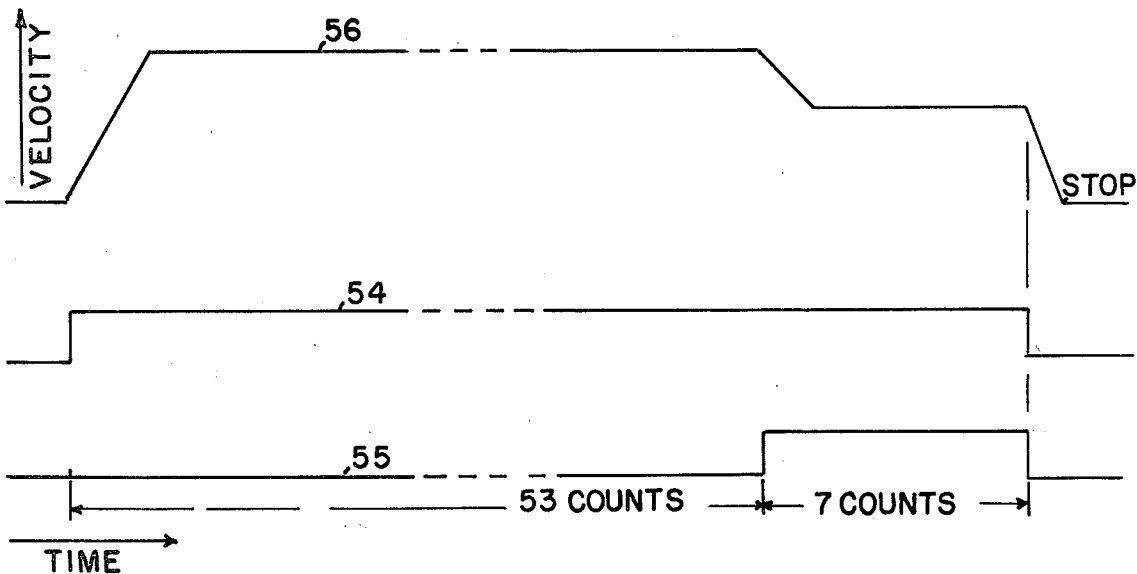
FIG. 4 is a schematic view which shows "run slow" waveforms.

This performance is illustrated in the velocity vs. time curves in FIG. 4. Curve 56 is the overall result.

Curve 54 is the run forward designation, which persists from start to finish of the cycle of 60 counts. Curve 55 depicts the run "slow" activity, which starts at count 53 and persists to count 60.

In curve 56 the servo system rapidly accelerates from an initial Stop condition at the left of the graph. It continues at "fast" velocity until the run "slow" designation 55 acts at count 53, after which curve 56 exhibits deceleration to the "slow" velocity, and thereafter returns to the Stop condition at count 60, at the right of the graph.

Figure 5:
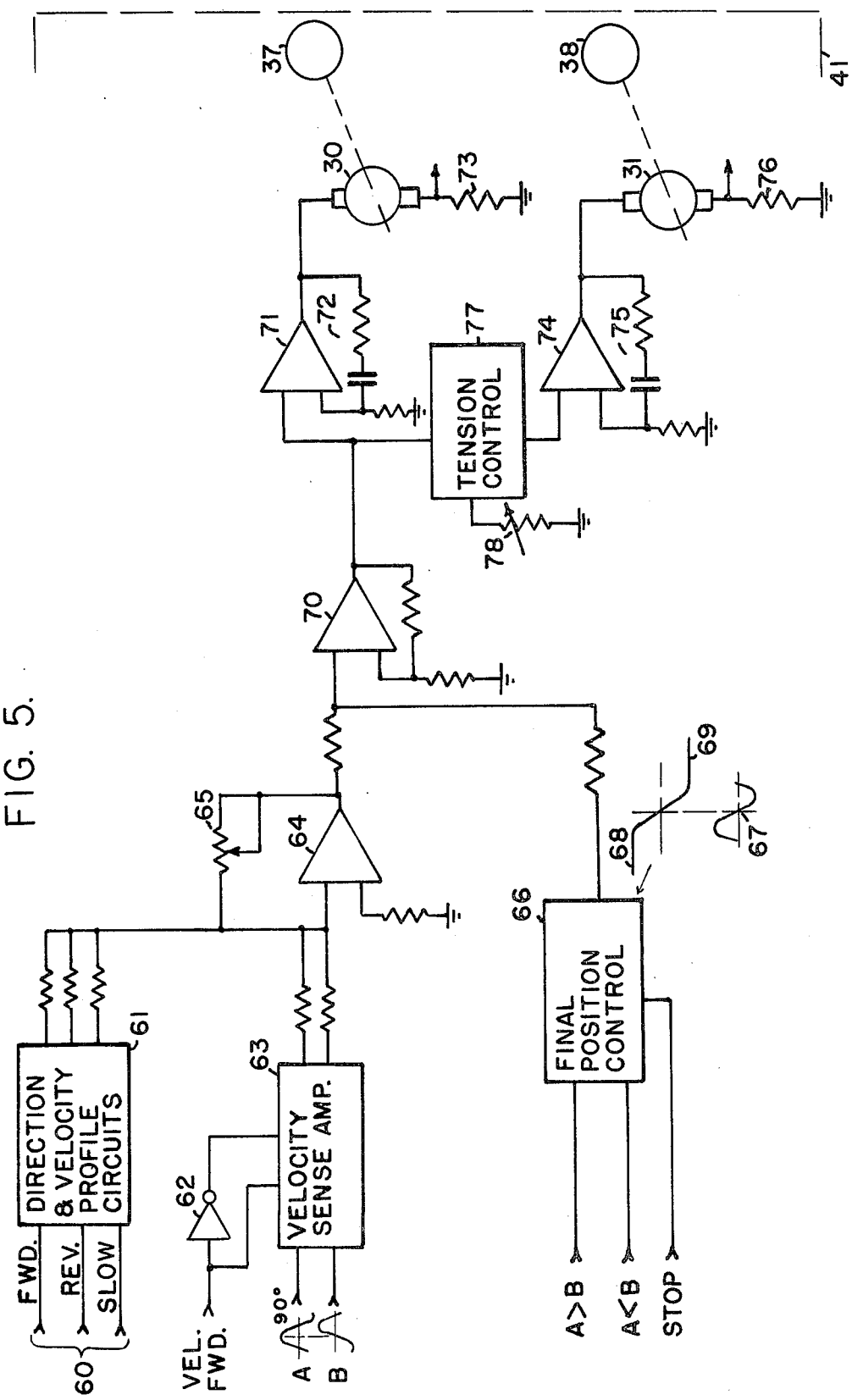
FIG. 5 is a block-schematic electrical diagram to provide the servo-motor film feed, a signal proportional to the velocity of translation of the film, and also a signal indicating the direction of transmission of the film.

FIG. 5 is a block-schematic diagram of the circuit for servo motors 30 and 31. This apparatus also provides velocity of film movement information and direction of film movement information.

The outputs of comparator 48 of FIG. 2 form the inputs 60 at FIG. 5 at the direction & velocity profile circuits 61. The "slow" input is from the comparator 48 (same) of FIG. 3. Circuits 61 are comprised of AND gates operative with FET switches, with summing resistors to combine the outputs.

Inverting amplifier 62 receives a "Velocity Fwd." input to initiate a slow retrace according to the desired fiche format. Both the input and the output of this amplifier pass into velocity sense amplifier 63.

Significant additional inputs to amplifier 63 are sine input A and cosine input B, coming directly from one encoder, as 37.

A resistor isolated output from amplifier 63, of two conductors connected together, and also to one input of differential amplifier 64, is shown in FIG. 5. The other input to amplifier 64 is connected to ground through a resistor. Further added to the summing at the one input of amplifier 64 are three connected outputs from circuits 61. The input and output of amplifier 64 are connected together through adjustable resistor 65, which acts as a gain adjustment.

The output of amplifier 64 passes through a summing resistor and to one input of differential amplifier 70.

Final position control 66 acts to determine an exact position for film travel based on a selected axis crossing of the alternating current generated by the rotary encoders when these are rotating.

The inputs to position control 66 are from the A>B and A<B outputs from FIG. 2. A Stop input is also supplied from comparator 48, being the A=B output therefrom.

In operation, the chosen count for stopping the longitudinal motion of film 40 is the zero axis crossing 67 on the waveform. Position control 66 holds the peak value of the waveform on both the positive and the negative sides of the selected zero crossing, as at 68 and 69. Since overshoot or undershoot is possible, without this feature the servos might lock onto an adjacent zero crossing, then being a half-cycle or more in error. The retain maximum amplitude at 68 and retain minimum amplitude at 69 makes this impossible, thus enhancing accuracy and stability.

The final position control 66 is essentially comprised of two operational amplifiers that are related to operate FET switches, with NAND and OR gates to retain the positive and the negative peak values of the directly adjacent half-cycles of the waveform.

Figure 7:
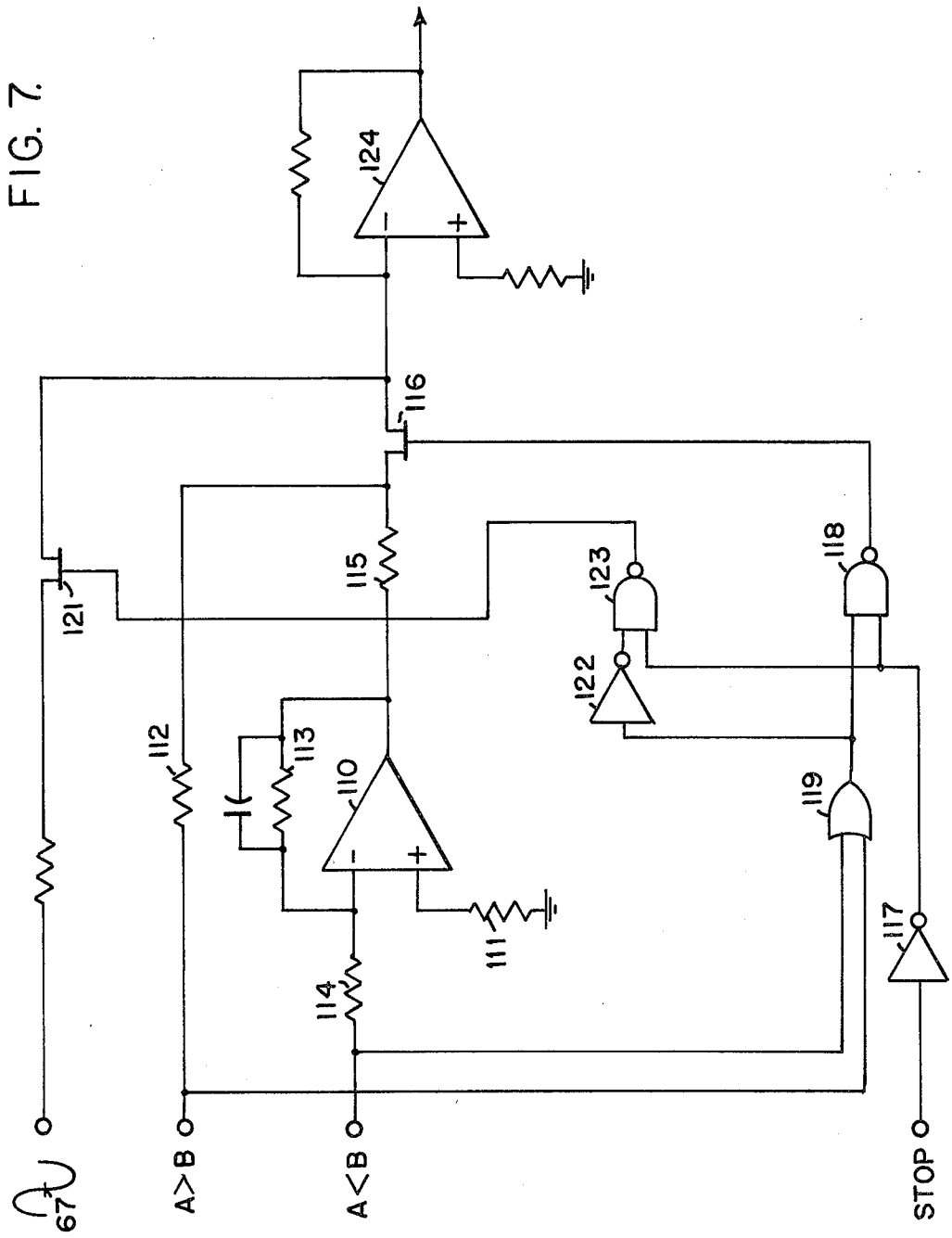
FIG. 7 is a schematic electrical diagram of entity 66 of FIG. 5.

The structure of final position control 66 is further presented in FIG. 7.

The first operational amplifier mentioned above is element 110 in FIG. 7. Resistors 111 through 115 that are connected to it all have the same resistance value, say 47,500 ohms. This makes amplifier 110 a unity gain inversion amplifier.

The A>B and A<B inputs to final position control 66 in FIG. 5, connect to the output and the input, respectively, of amplifier 110 to operate FET switch 116.

The Stop input, previously defined as present when A=B, enters inverting amplifier 117 and then to one input of NAND gate 118. Inputs A>B and A<B also enter OR gate 119, the output of which enters the second input of NAND gate 118.

With these inputs present the output of NAND gate 118 shuts off the gate of FET switch 116, thus indicating at least a provisional stop condition.

Since mechanical elements, carriage 2 or film 40, may exhibit overshoot because of inertia, the sine wave input from encoder 36 or 37, respectively, enters final position control 66 and one electrode of FET switch 121 to correct such overshoot by briefly turning the FET switches on.

FET 121 is controlled, as was FET 116, by having its own inverting amplifier 122 and NAND gate 123. The output of the latter is connected to the base of FET 121.

The outputs of both of the FET switches are joined and summed in final position summing amplifier 124. The output of this amplifier is the output of the final position control 66 of FIG. 5. This output is one of the summed input to amplifier 70 of FIG. 5.

As has been previously stated, the zero-crossing 67 of FIG. 5 is the precise index of where the mechanical element involved is to stop.

The output from position control 66 is summed at the one input terminal of differential amplifier 70; the same terminal as receives the output from velocity sensing amplifier 63 (through differential amplifier 64).

The output of amplifier 70 enters one terminal of power differential amplifier 71, which is capable of providing an output of approximately 12 watts for a typical embodiment. A resistor-capacitor series feedback circuit 72 connects to the second input of amplifier 71 and through a resistor to ground. This circuit sets the bandwidth of the amplifier.

The output of amplifier 71 powers servo motor 30. A current sense feedback output is taken across a low ohmage resistor 73 in the motor circuit to complete the servo loop back to the logic of FIG. 2.

A duplicate circuit for second servo motor 31 is comprised of second power amplifier 74, having feedback circuit 75 and current sense feedback resistor 76.

The input of second power amplifier 74 is connected to the input of first power amplifier 71 through tension control 77. This circuit arranges that there will always be an opposite power bias between motors 30 and 31. With both motors at rest the opposite bias will be equal on both motors. With the film driven forward, motor 30, say, will have a much larger power bias to accomplish the motion, but the other motor will retain the same opposite bias, thus keeping film 40 taut.

Tension control 77 is a passive network. Adjustable resistor 78 coacts therewith and allows adjustment of the tension by the operator.

By the previously described belts each motor is mechanically coupled to a film roller, 20 or 21. Encoders 37 and 38 are attached to the shafts of the rollers, thus closing the servo loops mechanically.

Servo motor 7 moves carriage 2 to position film 40 transversely. This motor is controlled by a duplicate of the apparatus and the circuit of FIG. 5; save that only one motor is controlled and energized. That is, motor 7 instead of motors 30 and 31.

Figure 6:
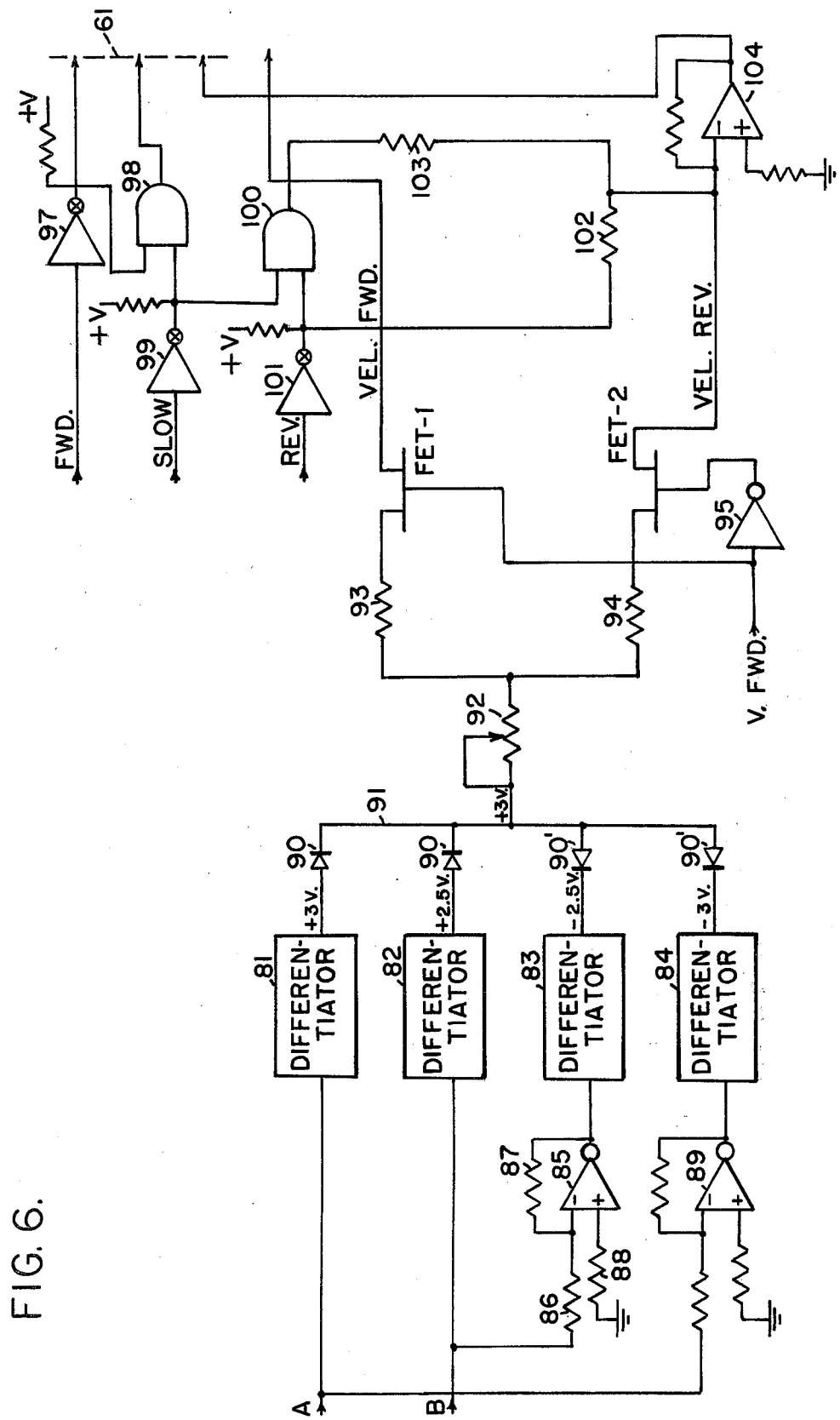
FIG. 6 is a block-schematic electrical diagram of elements 63 and 61 of FIG. 5.

FIG. 6 shows a block—schematic diagram of the circuit elements comprising velocity sense amplifier 63 of FIG. 5. It includes an electronic digital tachometer (tach.) circuit.

Input terminals A and B are connected to four preferably identical differentiators 81, 82, 83, 84. Differentiator 81 is connected directly to terminal A and differentiator 82 is connected directly to terminal B. These differentiators may be type LM349 operational amplifiers arranged for differentiation.

Polarity inverting amplifier 85 is also connected to terminal B through resistor 86, which may have a resistance of 10,000 ohms. Feedback resistor 87 may have an equivalent resistance. These resistors are connected to the − terminal of the amplifier. The + terminal is connected to ground through resistor 88, of 4,700 ohms. The inverted output of amplifier 85 is connected to differentiator 83.

Polarity inverting amplifier 89 is connected to terminal A, is constituted the same as inverting amplifier 85, and the output thereof is connected to differentiator 84.

Each of the differentiators is connected through a diode 90 or 90' to a common output bus 91. Differentiators 83 and 84, carrying an inverted signal polarity, are connected through diodes 90', which are connected in inverted polarity with respect to that of diodes 90.

The diodes and common output connection 91 constitute an OR gate, in which the largest positive polarity output from a differentiator is passed on to the remainder of the circuit.

Terminal A is connected to accept a sine waveshape, as was discussed in connection with that terminal A in FIG. 5. Terminal B accepts a cosine waveshape. These two waveshapes are, of course, 90° out of phase with each other and have a sinusoidal shape.

In FIG. 6, illustrative voltage outputs are shown adjacent to the output conductor of each differentiator. These outputs correspond the the rate of change of the inputs, and are, from differentiators 81 to 84, +3 v., +2.5 v., −2.5 v., & −3 v., respectively. The output at common connection 91 is thus +3 volts.

This output passes through adjustable resistor 92, which may have a total resistance of 100,000 ohms, and is the speed adjustment for the system; i.e., the resistance value chosen for this resistor by manual adjustment determines the maximum speed of rotation of motors 30 and 31 of FIG. 5.

Resistor 92 is connected through resistor 93 to the source of FET-1, the collector of which gives a velocity forward output. The drain of the same is connected to the velocity forward (V. Fwd.) input from servo control means 41.

Similarly, resistor 92 is connected through resistor 94 to the source of FET-2, the collector of which gives a velocity reverse output. The drain is connected to the output of inverting amplifier 95, the input of which is fed from V. Fwd.

Motors 30 and 31 revolve in the forward direction with one polarity of electrical d.c. input and in the reverse direction with the opposite polarity. In order to exert speed control the output of the apparatus of this part of FIG. 6 must provide the opposite polarity. Otherwise, the motors would continue to accelerate and there would be no speed control.

If forward velocity is to be controlled, FET-1 of FIG. 6 is conductive by virtue of an "on" potential upon the drain thereof from the V. Fwd. input, which input comes from inputs 60 of FIG. 5.

If reverse velocity is to be controlled, FET-2 of FIG. 6 is conductive by virtue of an "on" potential upon the drain thereof derived from inverting amplifier 95.

FET-2 is turned off when FET-1 is turned on, and vice versa. In this way, for forward direction of the motors, the control output is of opposite polarity to the polarity giving the forward direction, and vice versa.

The previously mentioned FWD input in FIG. 5 passes in FIG. 6 through inverting amplifier 97, which has an open collector. At the output of this amplifier a +v potential through a resistor supplies pull-up voltage. An input to AND gate 98 is taken from the output of the amplifier.

The previously mentioned SLOW input similarly passes through inverting amplifier 99 to a +v potential, and to the other input of AND gate 98. The output therefrom provides a forward—slow output for motor control. This is as previously designated the output of FIG. 3.

A connection from the output of amplifier 99 also enters one input of AND gate 100. The other input to this gate is from the REV. of FIG. 5. Another +v potential through a resistor is provided at the output of inverting amplifier 101, into the input of which amplifier the REV. input is connected. Also at the output of amplifier 101, resistor 102 is connected, which may have a resistance of 1,000 ohms.

The output of AND gate 100 passes through a resistor 103, which may have a resistance of 16,900 ohms. The second terminals of resistors 102 and 103 are connected together and to the velocity reverse (VEL. REV.) output of FET-2.

This forms the active (−) input to amplifier 104, which is the reverse motor control amplifier, and is provided with a known second (+) input to ground resistor and input to output feedback resistor. The output of this amplifier forms the third output from entity 61.

In FIG. 5 these three outputs each have a summing resistor, having individual resistances of 15,000, 16,900, & 16,900 ohms, respectively, from top to bottom. These outputs are summed into amplifier 64 in FIG. 5. The prior description pertinent to this part of that figure applies.

Further, FWD corresponds to the previously mentioned A>B, SLOW to A=B, and REV to A<B.

The output from amplifier 104, when present, causes all of the motor energizations to be for reverse rotation.

When the predetermined final position is reached, final position control 66 of FIG. 5 causes the three summed outputs previously mentioned to be turned off; i.e., neutralized in effect.

In addition to incremental reverse rotation of the motors to attain the final position, a full reverse traverse of the width of the microfiche film is made when the apparatus is operated to give the "row" mode of fiche progression.

We claim:

1. Orthogonal film strip driving means, comprising;
   (a) means (20,21) defining a film path, including means (2) for transversely moving said film strip (40),
   (b) means for tautly longitudinally translating said film strip (20,21,30,31,77) and for maintaining said film strip taut while said film strip is at rest,
   (c) plural signal means (37,38) for electrically indicating the longitudinal position of said film strip coupled to said means for tautly longitudinally translating said film strip,
   (d) electrical means (45,46) for generating one signal electrically indicating the longitudinal position of said film strip from plural signals of said plural signal means,
   (e) electrical means (61,63) for determining the velocity of longitudinal motion of said film strips connected to said plural signal means, and
   (f) electrical means (61) for determining the direction of longitudinal motion of said film strip connected to said electrical means to determine the velocity of motion of said film strip.

2. The driving means of claim 1, in which said means defining a film path comprises;
   (a) a carriage (2) to hold a portion of a film strip (40),
   (b) means to move (7,10) said carriage transversely of said film strip,
   (c) a first roller (20) upon said carriage for longitudinally translating said film strip, and
   (d) a second roller (21) upon said carriage for cooperatively longitudinally translating said film strip in relation to said first roller.

3. The driving means of claim 2, in which said means for tautly longitudinally translating said film strip comprises;
   (a) a first servo-motor (30) upon said carriage coupled to drive said first roller,
   (b) a second servo-motor (31) upon said carriage coupled to drive said second roller, and
   (c) servo control means (41) electrically connected to both of said servo-motors to oppositely energize said servo-motors so that said film strip is under constant and substantially uniform tension.

4. The driving means of claim 3, in which said servo control means (41) includes;
   (a) a passive electrical network tension control (77), and
   (b) an adjustable resistive element (78) electrically connected to said passive electrical network for the adjustment of the tension.

5. The driving means of claim 3, in which said servo control means (41) includes;
   (a) means to center an electrical bias for energizing both said servo-motors at zero electrical level when said servo-motors are at rest,
   and to center said electrical bias away from zero electrical level when said servo-motors are not at rest,
   to maintain said film strip under constant and substantially uniform tension both at rest and in motion.

6. The driving means of claim 1, in which said plural signal means for electrically indicating the longitudinal position of said film strip comprises;
   (a) a first encoder (37) coupled to said first roller (20),
   (b) a second encoder (38) coupled to said second roller (21), and
   (c) plural electronic multiplying means (45) connected to said first and second said encoders and also connected together to give an output.

7. The driving means of claim 6, in which said plural electronic multiplying means for generating one signal comprises;
   (a) an even number of electronic multiplying means symmetrically connected to said first and said second encoders (37 & 38), and also connected together to give said one signal.

8. The driving means of claim 1, in which said electrical means (63) for determining the velocity of motion of said film strip comprises;
(a) input means (A,B,85,89) connected to a said plural signal means (37) to output plural related cyclical signals from a signal of said plural signal means,
(b) differentiating means (81,82,83,84) connected to said input means to generate plural related time derivatives from said plural related cyclical signals, and
(c) slope selection means (90,91) connected to said differentiating means to pass the maximum positive value signal from the signals of said differentiating means.

9. The driving means of claim 8, in which;
(a) said input means outputs sine and cosine signals, and the inverse of the sine and cosine signals corresponding to the status of said a plural signal means (37),
(b) said differentiating means is comprised of four differentiator means (81,82,83,84), to accept the outputs of said a plural input means and to output four corresponding outputs, and
(c) said slope selection means is comprised of diode means (90) and a common connection (91) to said diode means,
for passing said maximum positive value signal.

10. The driving means of claim 1, in which said electrical means for determining the direction of motion of said film strip comprises;
(a) means (61) to output the derivative of a sine angle signal, derived from motion of said film strip,
(b) means (61) to output the derivative of a cosine angle signal, derived from motion of said film strip, and
(c) combining means (61) connected to both said means to output derivatives of said sine angle and said cosine angle signals, to provide an output related to both said signals being the same polarity for motion of said film strip in one direction, and a different output related to the same said signals being of different polarity for motion of said film strip in the opposite direction.

11. The driving means of claim 1, which additionally includes;
(a) switch means (43) to select an increment of film travel,
(b) means (47) to count the true position of said film strip (40), connected to said electrical means (45,46) for generating one signal,
(c) an electrical adder (44) having connections to said switch means (43) and to said means (47) to count the true position of said film,
(d) latch means (49) connected for receiving an output from said electrical adder (44), and
(e) electrical comparator means (48), connected to said latch means (49), and to said means to count (47),
to produce plural separate signals indicative of the position of said film strip relative to said selected increment of film travel.

12. The driving means of claim 11, which additionally includes means to obtain slow film travel relative to the normal speed of film travel as obtained with the apparatus of claim 11, comprising;
(a) further switch means (50) for selecting the length of the time interval during which said film strip is to travel slowly, and
(b) electrical subtractor means 51 connected to said further switch means (50) and to said latch means (49),
to provide an output to said comparator (48) to maintain said slow film travel for said selected interval.

13. The driving means of claim 1, which additionally includes a final position control (66) having;
(a) plural amplifier means to accept plural inputs (A,B),
(b) plural solid state switches connected to said plural amplifier means, and
(c) plural solid state gates connected to said solid state switches
to hold the positive (68) and the negative (69) peak values of a said plural input at the selected position, so that that position is retained.

* * * * *